(12) United States Patent
MacInnis et al.

(10) Patent No.: US 9,154,749 B2
(45) Date of Patent: Oct. 6, 2015

(54) POWER SAVING TECHNIQUES FOR WIRELESS DELIVERY OF VIDEO

(75) Inventors: Alexander G. MacInnis, Los Altos, CA (US); Murat Mese, Rancho Palos Verdes, CA (US); Brima B. Ibrahim, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 428 days.

(21) Appl. No.: 13/589,506

(22) Filed: Aug. 20, 2012

(65) Prior Publication Data

US 2013/0266073 A1      Oct. 10, 2013

Related U.S. Application Data

(60) Provisional application No. 61/621,542, filed on Apr. 8, 2012.

(51) Int. Cl.
| | |
|---|---|
| H04N 7/00 | (2011.01) |
| H04N 7/56 | (2006.01) |
| H04N 21/4363 | (2011.01) |
| H04N 21/442 | (2011.01) |

(52) U.S. Cl.
CPC ........... *H04N 7/56* (2013.01); *H04N 21/43637* (2013.01); *H04N 21/44227* (2013.01)

(58) Field of Classification Search
CPC . H04N 7/50; H04N 7/26244; H04N 7/26313; H04N 7/26271; H04N 7/26015
USPC .................................................... 375/240.24
See application file for complete search history.

(56) References Cited

U.S. PATENT DOCUMENTS

| | | | | |
|---|---|---|---|---|
| 6,496,228 | B1 * | 12/2002 | McGee et al. | 348/700 |
| 8,077,969 | B2 * | 12/2011 | Rossato et al. | 382/173 |
| 8,488,682 | B2 * | 7/2013 | Chang et al. | 375/240.25 |
| 2008/0151997 | A1 * | 6/2008 | Oguz | 375/240.02 |
| 2012/0307887 | A1 * | 12/2012 | Concion | 375/240.02 |

OTHER PUBLICATIONS

Luna et al. Joint Source Coding and Data Rate Adaptation for Energy Efficient Wireless Video Streaming; IEEE Journal on Selected Areas in Communications, vol. 21, No. 10, Dec. 2003.*
Han et al. Using Checksum to Reduce Power Consumption of Display Systems for Low-Motion Content; 978-1-4244-5028-2/09 2009 IEEE.*

* cited by examiner

*Primary Examiner* — Jay Au Patel
*Assistant Examiner* — Frank Huang
(74) *Attorney, Agent, or Firm* — Garlick & Markison; Bruce E. Garlick (57) ABSTRACT

Methods for removing redundancies in a video stream based on efficient pre-transmission detection of static portions of the video stream. In one embodiment supporting wireless transmission of a video stream having a series of video frames, a mathematical operation (such as a hash function, summing operation or CRC) is performed on (1) a (reconstructed) data block(s) of a video frame in order to generate a first check value and (2) a co-located data block(s) of a second, sequential video frame in order to generate a second check value. The first and second check values are compared to detect static video content in the video stream. When static video content in a video stream is detected, the static nature of the content is indicated in the compressed bit stream and the amount of wirelessly transmitted data corresponding to the static portions of the video stream may be reduced.

20 Claims, 8 Drawing Sheets

POWER SAVING TECHNIQUES FOR WIRELESS DELIVERY OF VIDEO

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Patent Application Ser. No. 61/621,542, entitled "Power Saving Techniques For Wireless Delivery of Video," filed Apr. 8, 2012, which is hereby incorporated herein by reference in its entirety and made part of the present U.S. Utility Patent Application for all purposes.

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11—1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D2.0, January 2012, "Draft STANDARD for Information Technology—Telecommunications and information exchange between systems—LAN/MAN—Specific requirements, Part 11: Wireless LAN Medium Access Control (MAC) and Physical Layer (PHY) specifications—Amendment 5: Enhancements for Very High Throughput for Operation in Bands below 6 GHz," Prepared by the 802.11 Working Group of the 802 Committee, 359 pages.

4. IEEE P802.11ad™, D7.0, "Draft STANDARD for Information Technology—Telecommunications and information exchange between systems Local and metropolitan area networks—Specific requirements, Part 11: Wireless LAN Medium Access Control (MAC) and Physical Layer (PHY) specifications, Amendment 6: Enhancements for Very High Throughput in the 60 GHz Band," Prepared by the 802.11 Working Group of the 802 Committee.

INCORPORATION BY REFERENCE

The following standards/draft standards are hereby incorporated herein by reference in their entirety and are made part of the present U.S. Utility Patent Application for all purposes:

1. "WD3: Working Draft 3 of High-Efficiency Video Coding, Joint Collaborative Team on Video Coding (JCT-VC)," of ITU-T SG16 WP3 and ISO/IEC JTC1/SC29/WG11, Thomas Wiegand, et al., 5$^{th}$ Meeting: Geneva, CH, 16-23 Mar. 2011, Document: JCTVC-E603, 215 pages.

2. International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

3. WiGig MAC and PHY Specification, Version 1.1; WiGig Wireless Display Extension (WDE) Specification, December, 2011; WiGig Bus Extension (WBE) Specification, June, 2011; and WiGig Serial Extension (WSE) Specification, December, 2011.

4. VESA DisplayPort™ Standard Version 1 Revision 2, Jan. 5, 2010, Video Electronics Standards Association.

5. High-Definition Multimedia Interface (HDMI) Specification Version 1.4b, Oct. 11, 2011, HDMI Forum.

BACKGROUND OF THE INVENTION

1. Technical Field of the Invention

The invention relates generally to wireless communication systems and the transmission of video data; and, more particularly, it relates to power and other cost saving techniques based on detection of static portions of a video stream.

2. Description of Related Art

Many approaches have been developed for improving power consumption and error robustness/concealment when transmitting video data. For example, power efficiency in a wireless video network delivering video packets may be improved by adaptively modifying the transmission power level of a wireless access point based upon device proximity data, wireless channel conditions, reception characteristics and the like. With respect to error concealment, network layer solutions may be utilized that attempt to recover the error/packet loss at the packet layer in order to provide an error free A/V stream to a receiver and its video decoder. Such solutions usually require redundant codes and retransmissions that may lead to increased power consumption in certain operating environments. Video layer solutions may also be employed, including post-processing that accepts a corrupted video stream and tries to mitigate gaps and mismatches in the decoded video frames.

As may be understood, network layer solutions and video layer solutions each involve tradeoffs. In particular, a heavily protected network layer might be very robust and resilient to errors, but usually this is accompanied by a reduction in the constant throughput of the channel and/or an increase in the effective latency of the channel. For the video layer, one of the primary considerations is the overall user experience (e.g., the perceptual experience of a user). Video should appear smooth and natural, even under variable network conditions. Under variable channel conditions, providing an acceptable user experience can be particularly challenging for real-time or near real-time video streams, as both packet loss and channel delay can have deleterious effects on perceived video quality (e.g., blocking or blurring effects, video freezing or jerkiness, and audio/video synchronization issues) and, potentially, power consumption in transmitting and receiving devices.

In order to improve utilization of available communication bandwidth for applications such as high definition streamed video, several short-range wireless personal/local area networking standards have emerged in recent years. Many of these technologies exploit high frequency and extremely high frequency radio bands (e.g., 60 GHz). Examples include the Wireless Gigabit Alliance (WGA) WiGig MAC and PHY specification/IEEE 802.11ad, WirelessHD/IEEE 802.15.3c, ECMA 387, Wireless Home Digital Interface (WHDI), and Wireless USB among others.

In addition to MAC/PHY specifications, groups such as WGA have also defined Protocol Adaptation Layers (PALs) that support specific data and display standards over the 60 GHz frequency band, including extensions for computer peripherals and display interfaces for HDTVs, monitors and projectors. For example, the WiGig Display Extension (WDE) specification supports HDMI mapping and wireless connections to DisplayPort monitors and HDMI televisions to enable cable replacement applications such as the wireless transmission of compressed or uncompressed video. The WiGig Bus Extension (WBE) specification enables a wireless version of the PCI Express (PCIe) slot, which provides connections for a wide variety of devices such as video cards and hard drives. Likewise, the Wireless Serial Extension (WSE) specification enables a high-speed serial communications link, providing a wireless version of the USB 3.0 technology. Similar approaches to wireless networking and cable replacement are being developed by other entities and industry groups.

DETAILED DESCRIPTION OF THE INVENTION

Novel approaches are presented herein for optimizing wireless video transmission over a packet-based communication medium/channel in order to reduce power consumption and bit rate. The novel approaches relate to removing redundancies in a video stream based on efficient pre-transmission detection of static portions of the video stream. The novel approaches are generally related to digital video compression, and generally applicable to video compression standards, protocols, and/or recommended practices (e.g., MPEG-4 Part 2, H.264 (AVC), VC-1, WMV, AVS, RealVideo and Quicktime, among others) to the extent that such standards and protocols support or may accommodate static content indication and recovery techniques. Further, while the novel approaches presented herein often employ wireless packet-based transmissions as exemplary embodiments (e.g., WiGig compliant transmissions), the various aspects and principles, and their equivalents, can also be extended generally to any transmission (regardless of the particular type of communication medium being employed such as wired, wireless, optical, et cetera), including over lossy or variable communication channels.

One known method for removing redundancy from a video stream is to detect portions of the video that are not changing ("static content") from one frame to another and only encode and/or transmit the portions that are changing. However, earlier approaches to determining whether a part of a video is static from one frame to another typically require storing at least one frame worth of raw video data in frame buffer memory. When the next frame is analyzed, the stored raw video data is read back for comparison purposes. However, write and read access to a frame buffer memory may require a very large amount of memory space and memory bandwidth, and consume a relatively large amount of power. In some applications, such as a wireless dongle or battery operated device, this level of power consumption may prove difficult to support. Further, component costs associated with frame buffer memory (sometimes implemented in a separate DRAM memory module or large internal memory) of sufficient size to store raw frame data can be relatively high.

Static content detection in accordance with the present disclosure may mitigate such power and cost concerns. For example, by performing certain mathematical operations (e.g., a hash function or CRC) on the video content used in a static content detection process, the amount of data that is written and read to memory is significantly reduced as compared to raw video data. This reduction in data not only reduces operational power, but may allow, for example, on-chip integration of cost effective memory.

Figure 1:
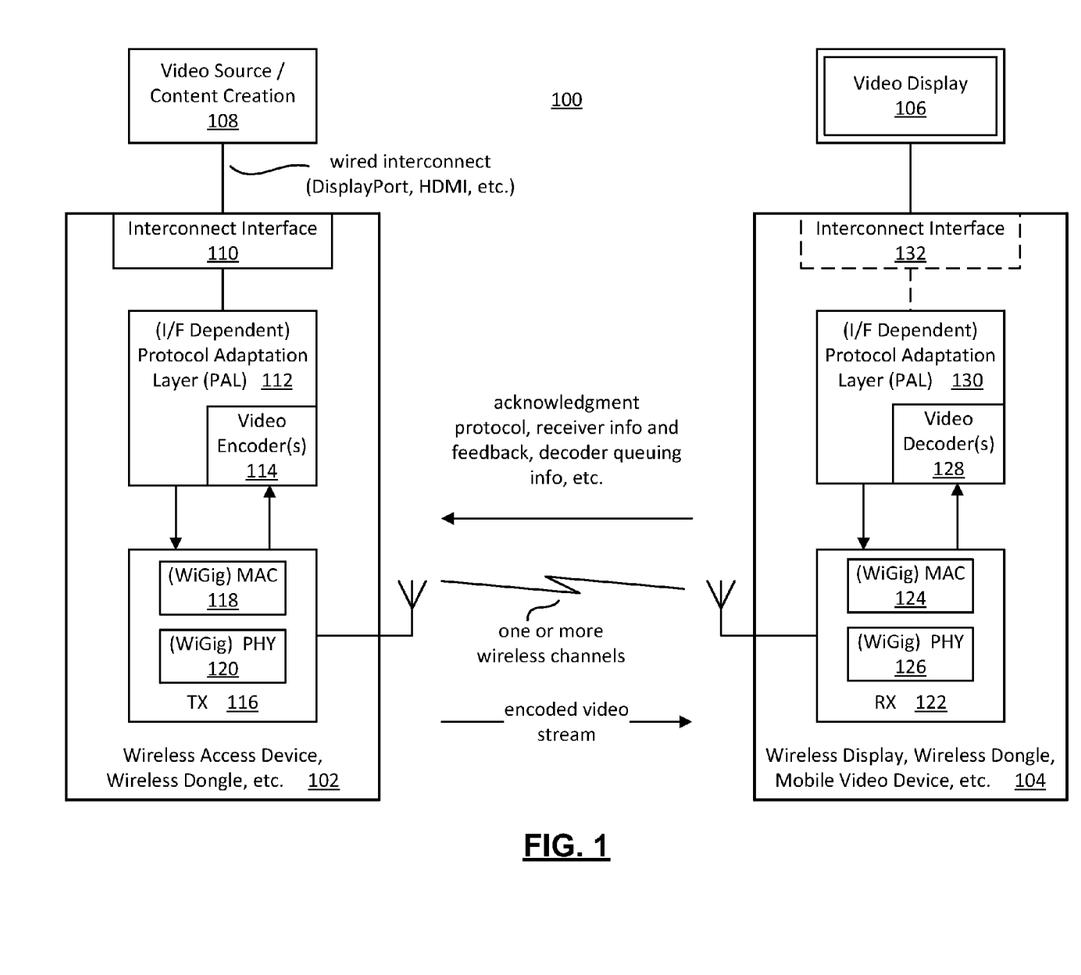
FIG. 1 is a block diagram representation of a communication network in which video data is wirelessly communicated between devices in accordance with an embodiment of the present disclosure.

Referring more specifically to the figures, FIG. 1 is a block diagram representation of communication network 100 in which video data and the like is wirelessly communicated between devices in accordance with an embodiment of the present disclosure. In particular, the illustrated network 100 distributes video content generated or relayed by a video source 108, through a wireless access device 102 over one or more wireless channels, to a wireless display device, wireless dongle, mobile video device, etc. (sometimes referred to hereinafter as "video device 104"). Other exemplary devices and network configurations are described below in conjunction with FIG. 8.

The video content might include movies, television shows, commercials or other advertisements, computer display content, tablet display content, cell phone display content, educational content, video gaming content, infomercials, or other program content and optionally additional data associated with such program content including but not limited to digital rights management data, control data, programming information, additional graphics data and other data that can be transferred in association with program content. Such video content may also have associated audio content. The video content may be sent as broadcast video, streaming video, video on demand and near video on demand programming, etc. Alternatively, the video content may be generated locally, for example by a computer, tablet, security camera, baby monitor or phone.

The video source 108 may be part of a dedicated video distribution network such as a direct broadcast satellite network or cable television network that distributes video content from a plurality of video sources, including video source 108, to a plurality of wireless access devices and, optionally, wired devices over a wide geographic area. Alternatively, the video source 108 can be part of a heterogeneous network that includes one or more segments of a general purpose network such as the Internet, a metropolitan area network, wide area network, local area network or other network such as an Internet protocol (IP) television network. Over various portions of a given network, the video content can be carried as analog and/or digital signals according to various recognized protocols.

The wireless access device 102 might be utilized with or included within a base station or access point that provides video content to one or a plurality of video subscribers over a wireless local area network (WLAN)/personal area network (PAN) such as an 802.11a/b/g/n/ac/ad, WiGig, WIMAX or other WLAN network, or a cellular network such as a UMTS, EDGE, 3G, 4G or other cellular data network. In addition, the wireless access device 102 may be utilized with a home gateway, video distribution point in a dedicated video distribution network or other wireless gateway for wirelessly transmitting video content, either alone or in association with other data, signals or services, to recipient devices. The wireless access device 102 includes one or more embodiments of the present disclosure that will be described in greater detail in conjunction with FIGS. 2-7 that follow.

The illustrated embodiment of the wireless access device 102 functions to encode and transmit a video stream provided by video source 108. Generally speaking, when considering a communication system in which video data is communicated wirelessly from one location, or subsystem, to another, video data encoding may be viewed as being performed at a transmitting side of the wireless channel, and video data decoding may generally be viewed as being performed at a receiving side of the wireless channel.

The video source 108 may relay video content to, e.g., a wireless access device 102 via an interconnect/interface 110 in accordance with a standardized protocol (PCIE, DisplayPort, HDMI, etc.). As noted, a protocol adaptation layer (PAL) 112 may be employed to support wireless implementations of specific data and display standards/interfaces. The PAL 112 of the illustrated embodiment provides video content to encoder 114 for encoding operations. It is noted that the encoder 114 may be incorporated within or generally specified by a particular PAL 112. In other embodiments, the encoder 114 (as well as any additional encoding/transcoding processes) may be external to the PAL 112.

Encoded video content from the encoder 114 is then provided to a network interface or transceiver/transmitter (TX) 116 for transmission to video device 104. In the disclosed embodiment, TX 116 includes medium access control (MAC) 118 and physical layer (PHY) 120 circuitry or functionality. A main purpose of the MAC 118 is to specify the priority and service class for higher layer packets and allocate the bandwidth of the wireless channel(s) and coordinate access when multiple video devices 104 or similar are sharing the channel. Among other operations, the MAC 118 may also perform Layer 2 service discovery operations wherein the PAL 112 is notified of the existence of other network devices. Among other functions, the PHY 120 establishes and terminates connections to the wireless channel(s). In the disclosed embodiment, PHY 120 generates and transmits modulated RF signals containing the encoded video stream over the wireless channel(s). As noted, the MAC 118 and PHY 120 may operate in accordance with a wide variety of communication protocols, such as those used in an IEEE 802.11ad or WiGig compliant network.

In the illustrated video device 104, a transceiver/receiver (RX) 122 receives RF signals (over one or more wireless channels) containing the encoded video stream. The PHY 126, in cooperation with the MAC 124, then demodulates and down converts these RF signals to extract the encoded video stream. In turn, the video decoder(s) 128 operates on video data from the extracted video stream to generate a decoded video stream for display on a video display 106. The video decoder(s) 128 may be incorporated within or distinct from a PAL 130 of the video device 104.

Via the PAL 130, an optional interconnect/interface 132 (including, for example, the various embodiments disclosed above in conjunction with interconnect/interface 110) may be utilized to provide decoded video content to, for example, a high definition television or projection system. In such embodiments, as well as other embodiments, the video display 106 may be part of or a separate component from the video device 104. Further, the video device 104 may function as a wireless relay to other (mobile) video devices for purposes of sharing communication capabilities/bandwidth and device resources, broadcast consumption, load balancing and distributed processes, power saving operations, etc.

As described herein, if the TX 116 signals a part of a frame/picture as static, the RX 122 might substitute the samples of this static part with the co-located samples of the previous frame ("static recovery"). Likewise, in some embodiments, co-located samples of a previous frame may have been substituted from an even earlier frame. Various methodologies may be employed for identifying and recovering static content spanning contiguous macro-blocks/slices and multiple frames.

The RX 122 of the disclosed embodiment also provides various transmissions to the wireless access device 102 including, for example, signaling in accordance with an acknowledgement (ACK/NACK) protocol, status information relating to the operation of the PHY 126 (for example, bit error rate before error correction or a signal-to-noise ratio (SNR)), and decoder queuing information. Such receiver information/feedback, in conjunction with transmitter side channel throughput indicia, may be utilized to generate estimates of current and/or expected channel throughputs under a variety of operating conditions.

The PAL 112, video encoder 114 and other functions of the wireless access device 102 can be implemented in hardware, software or firmware. In particular embodiments, the PAL 112 and video encoder 114 may be implemented using one or more microprocessors, microcomputers, central processing units, field programmable logic devices, state machines, logic circuits, analog circuits, digital circuits, and/or any devices that manipulate signals (analog and/or digital) based on operational instructions that are stored in a memory module. The function, steps and processes performed by PAL 112 or video encoder 114 can be split between different devices to provide greater computational speed and/or efficiency. Associated memory modules may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the PAL 112 and/or video encoder 114 implement one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Further, within each of the wireless access device 102 and video device 104 (examples of which are listed above), any desired integration or combination may be implemented for the various components, blocks, functional blocks, circuitries, etc. therein, and other boundaries and groupings may alternatively be performed without departing from the scope and spirit of the invention. Likewise, while shown as separate from video source 108, the wireless access device 102 could be incorporated into video source 108.

Figure 2:
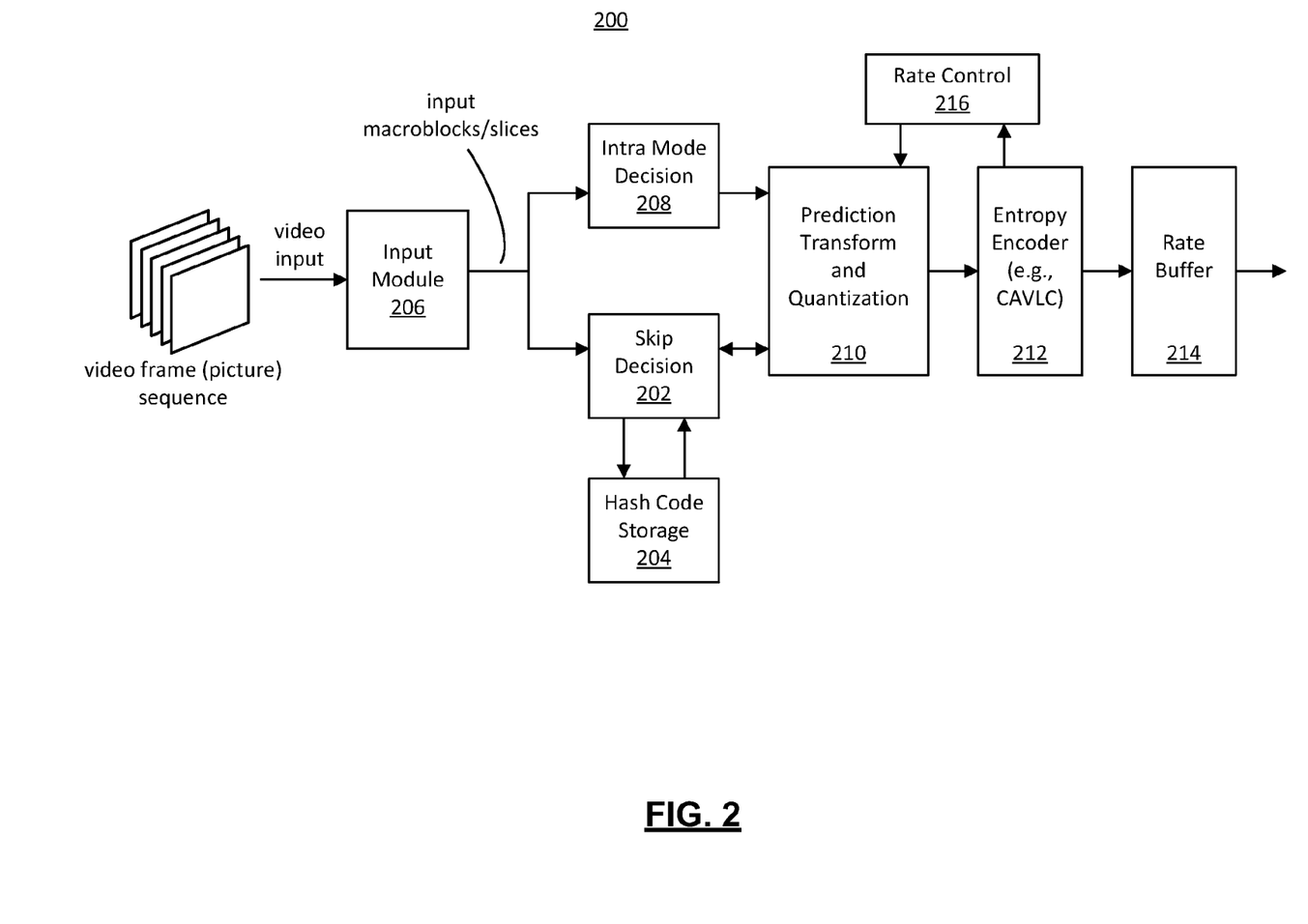
FIG. 2 is a functional block diagram of an encoding process including static content detection in accordance with various embodiments of the present disclosure.

FIG. 2 is a functional block diagram of an encoding process 200 including static content detection in accordance with various embodiments of the present disclosure. In this diagram, static content detection is primarily performed by skip decision functionality 202 operating in conjunction with hash code storage 204. Briefly, in various embodiments a skip decision may be reached by comparing hash codes/check values (or the like) of (1) a current input macro-block or slice and (2) a co-located previous input macro-block or slice in order to identify a static portion(s) of video input. In one alternate embodiment, a skip decision may involve comparing hash codes of (1) a reconstructed version of an input macro-block or slice and (2) a reconstructed version of a co-located previous macro-block or slice. In such an embodiment, the reconstructed version of the input macro-block or slice may be generated by prediction, transform and quantization functionality 210. Details of an embodiment of skip decision functionality 202 are described below in conjunction with FIG. 3.

Various functions and operating modes of the intra mode decision 208, prediction, transform and quantization 210, entropy encoder (e.g., CAVLC) 212, rate buffer 214 and rate control 216 (including operations not separately illustrated) are described generally below in an exemplary encoder embodiment that operates in accordance with the AVC video encoding standard. It is noted that a corresponding video decoder, such as located within a device at a receiving end of a communication channel, is operative to perform the complementary processes of decoding, inverse transform, and reconstruction to produce a respective decoded video sequence that is (ideally) representative of the input video signal.

As illustrated, an input video signal is received by an input module 206 of the video encoder. In certain embodiments, the input video signal is composed of macro-blocks. The size of such macro-blocks may be varied, and can include a number of pixels typically arranged in a square shape. In one embodiment, such macro-blocks have a size of 16×16 pixels. It is noted, however, that a macro-block may have any desired size such as N×N pixels, where N is an integer. Of course, some implementations may include non-square shaped macro-blocks, although square shaped macro-blocks are employed in a preferred embodiment. In some embodiments, macro-blocks of a video signal comprise a set of luma samples of one particular arrangement (e.g., 16×16), and a set of the chroma samples of a different particular arrangement (e.g., 8×8 for each of two chroma components). In accordance with the embodiment depicted herein, a video encoder processes such samples on a block by block basis.

The input video signal of this embodiment may undergo mode selection by which the input video signal is selectively subjected to intra and/or inter-prediction processing. In other modes, neither intra and/or inter-prediction is used, and the input video signal undergoes transform operations (e.g., in accordance with discrete cosine transform (DCT)) such as those described below. Of course, other transforms may be employed in alternative embodiments. In this mode of operation, the input video signal itself is compressed. The compression process may take advantage of the lack of high frequency sensitivity of human eyes in performing the compression.

As noted, selective use of inter- or intra-prediction video encoding may be used in the encoding process. In accordance with a predictive mode of operation, for example, the encoding process utilizes a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block is generated, the predicted value based on at least a portion of that same frame (or picture) or on at least a portion of at least one other frame (or picture).

In one embodiment of the encoding process, a discrete cosine transform (DCT) operates on a set of video samples (e.g., luma, chroma, residual, etc.) to compute respective coefficient values for each of a predetermined number of basis patterns. For example, different embodiments may employ different numbers of basis functions (e.g., different sizes of transforms). Any combination of those respective basis functions, including appropriate and selective weighting thereof, may be used to represent a given set of video samples, which may themselves be prediction residual samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may operate to convert most of the less relevant coefficients to a value of zero. That is to say, those coefficients whose relative contribution is below some predetermined value/threshold may be eliminated in accordance with the quantization process. A quantizer may also convert the significant coefficients into values that can be coded more efficiently than those that result from the transform process. For example, the quantization process may operate by dividing each respective coefficient by an integer value and discarding any remainder. Such a process, when operating on typical macro-blocks, typically yields a relatively low number of non-zero coefficients which are then delivered to an entropy encoder for lossless encoding and for use in reconstructing a block of samples similar to what a decoder of the compressed video would reconstruct. Reconstructed blocks of samples may be used with a feedback path which may select intra-prediction and/or inter-prediction processing.

An entropy encoder operates in accordance with a lossless compression encoding process. In contrast, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. In accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). A table may be prepared in advance that assigns variable length codes for value pairs, such that relatively shorter length codes are assigned to relatively common value pairs, and relatively longer length codes are assigned for relatively less common value pairs.

In the case of a macroblock that has been determined to be static (e.g., where the encoder chooses to indicate to the receiver that the macroblock should be reconstructed from a previous co-located macroblock), the entropy coding process may not be performed for that macroblock. Alternatively, the results of entropy coding of the quantized transformed residual of that macroblock may not be included in the output video bit stream. The encoder may indicate that a macroblock is static or a plurality of consecutive macroblocks are static via a short code. For example, in accordance with the AVC video encoding standard, a macroblock may be indicated as type P-skip. P-skip macroblocks are reconstructed using a prediction from a previously coded picture, with no non-zero residual coefficients. Under certain conditions, the prediction uses a co-located macroblock from the previous picture. In the WiGig WDE PAL specification, the P-skip notation is utilized to indicate that a macroblock is static and should be reconstructed from the co-located macroblock of the previous frame.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations. It is further noted that in accordance with intra-prediction operations, a relatively small amount of storage may be sufficient and it may not be necessary to store the current frame (or picture) or any other frame (or picture) within the frame (or picture) sequence, unless needed for purposes of static content detection or the like. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). A suitable matching area is located (e.g., prediction reference) and a vector offset (e.g., motion vector) is then produced. In a single frame (or picture), a number of motion vectors may be found and not all will necessarily point in the same direction. One or more operations as performed in accordance with motion estimation are operative to generate one or more motion vectors.

Motion compensation employs one or more motion vectors as may be generated in accordance with motion estimation. A prediction reference set of samples is identified and delivered for subtraction from the original input video signal in an effort to yield a relatively lower energy residual. If such operations do not result in a sufficiently low energy residual, the encoder may choose not to use motion compensation, and the encoder may choose instead to use intra prediction, or alternatively frequency domain prediction or no prediction. In accordance with exemplary video compression standards, transform operations are performed on the residual resulting from whichever form of prediction is selected, or on the original input signal in case no prediction was selected. Also, if the motion estimation and/or motion compensation operations are selected, the motion vector may also be sent to the entropy encoder along with the corresponding residual's transformed and quantized coefficients for use in lossless entropy encoding.

The output from the overall video encoding operation is an output bit stream. It is noted that such an output bit stream may undergo certain processing in accordance with generating a continuous time signal which may be transmitted via a communication channel. For example, in certain embodiments operating within wireless communication systems, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Figure 3:
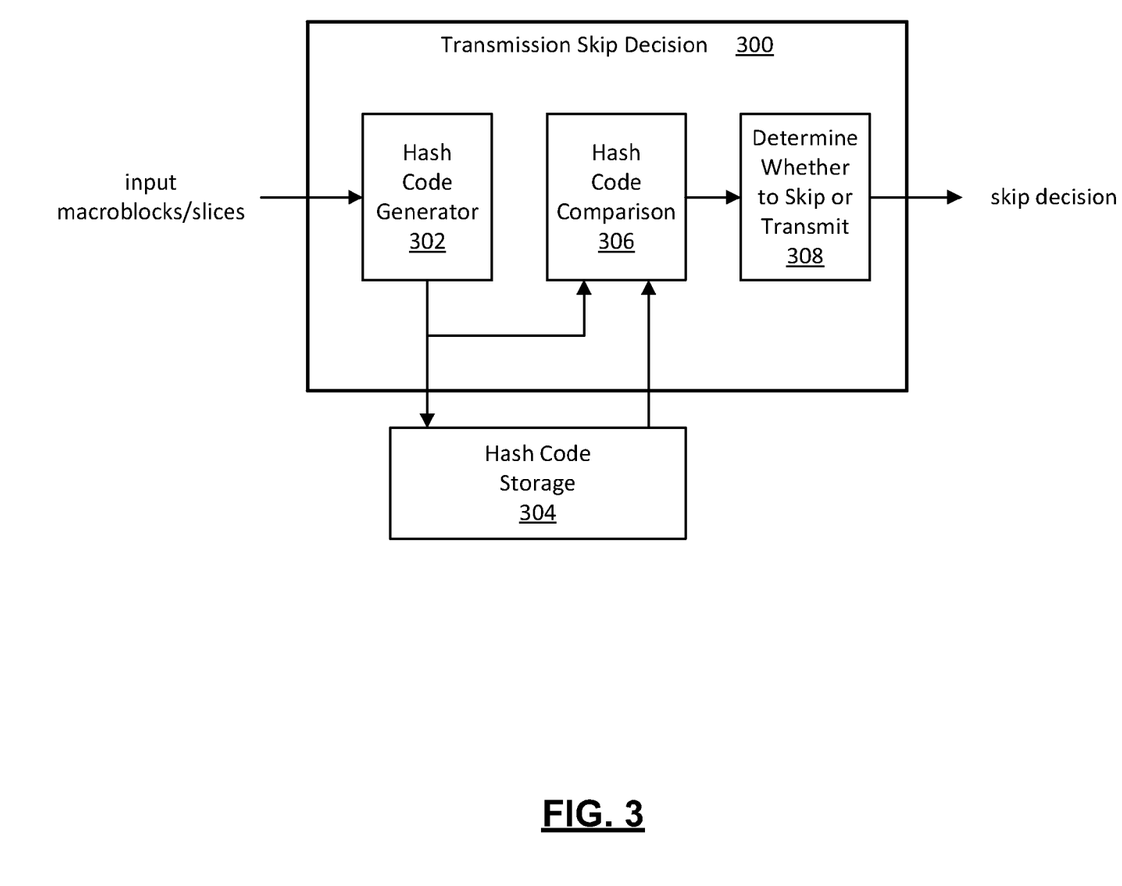
FIG. 3 is a functional block diagram of static content detection in accordance with an embodiment of the present disclosure.

FIG. 3 is a functional block diagram of static content detection in accordance with an embodiment of the present disclosure. In this embodiment, transmission skip decision 300 functionality (for example, skip decision 202) performs mathematical operations (e.g., hashing or summing functions, etc., referred to generally as "hash codes") on input data such as macro-blocks or slices, or reconstructed versions thereof. Such mathematical operations are performed by hash code generator 302, the output of which (generically, "check values") is maintained in hash code storage 304 (in the case of previous operations) and/or provided directly to hash code comparison 306. The illustrated embodiment of hash code comparison 306 is operable to compare check values relating to a current frame with stored check values.

Examples of mathematical operations that may be performed by hash code generator 302 include, without limitation:

1. Generating a sum of R, G, B components in the data block, either separately or together, wherein the accumulation is done with a fixed number of digits or bits. The accumulation might be performed in a finite field or Galois field to improve robustness. As an example, accumulation performed for part of a picture of size 1920×16 pixels, with running sums of 24 bits for each R,G,B pixel (approximately 92 Kbytes), might be represented with a 63 bit word.

2. Performing a cyclic redundancy check (CRC) of the video components in the data block, either separately or together. Video components may be, for example, in Y, Cb and Cr; R, G and B, or other formats. A CRC may be calculated for each macro-block (e.g., a 16×16 array of pixels). In exemplary embodiments each CRC might have a length of 16 or 32 bits.

3. Performing hash functions similar to those used in cryptographic hash functions. Such hash functions might include, for example SHA-1 or SHA-2.

Using the results of the hash code comparison 306, an evaluation process 308 is then performed to determine whether to skip (e.g., not encode and/or not transmit) a relevant portion of the frame, or to transmit it. For example, the evaluation process may ascertain whether the check values/hash codes are identical and therefore indicate static content. Depending on the type of mathematical operation that is performed or the nature of the video content, various "similarity" thresholds may be employed such that video content that is close to static (or within a predetermined range(s) of acceptability), or contains noise or transmission artifacts, may be skipped. Further, hash codes for adjacent or related content may be utilized in the evaluation process 308.

Figure 4:
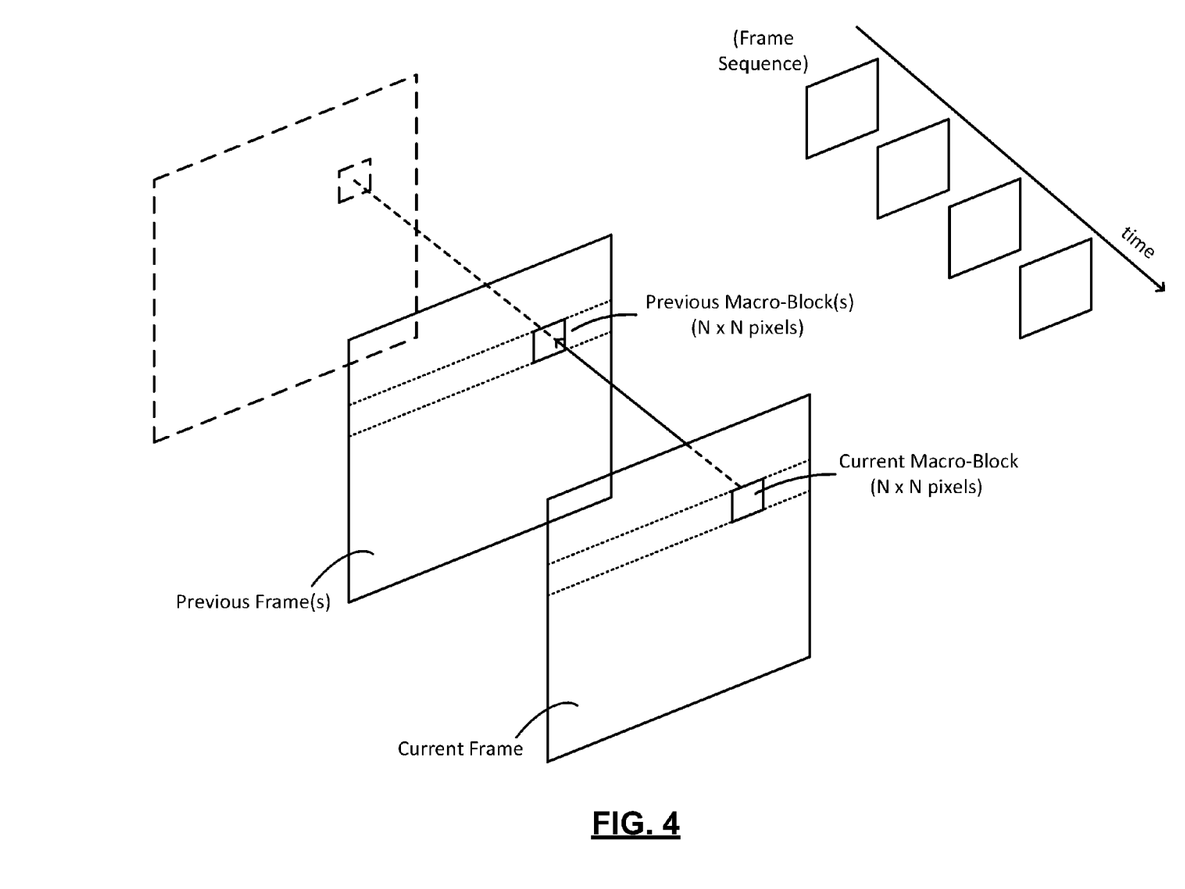
FIG. 4 is a video frame sequence illustrating further aspects of static content detection in accordance with various embodiments of the present disclosure.

FIG. 4 is a video frame sequence illustrating further aspects of static content detection in accordance with various embodiments of the present disclosure. In the illustrated frame sequence, a current macro-block of N×N pixels from one frame (or picture) and a previous, co-located macro-block of N×N pixels from a previous frame(s) (or picture(s)) are utilized in a static content detection process such as that of FIG. 3. In various other embodiments, a slice or consecutive set of macro-blocks may be used to generate the check values employed in a skip decision.

Figure 5:
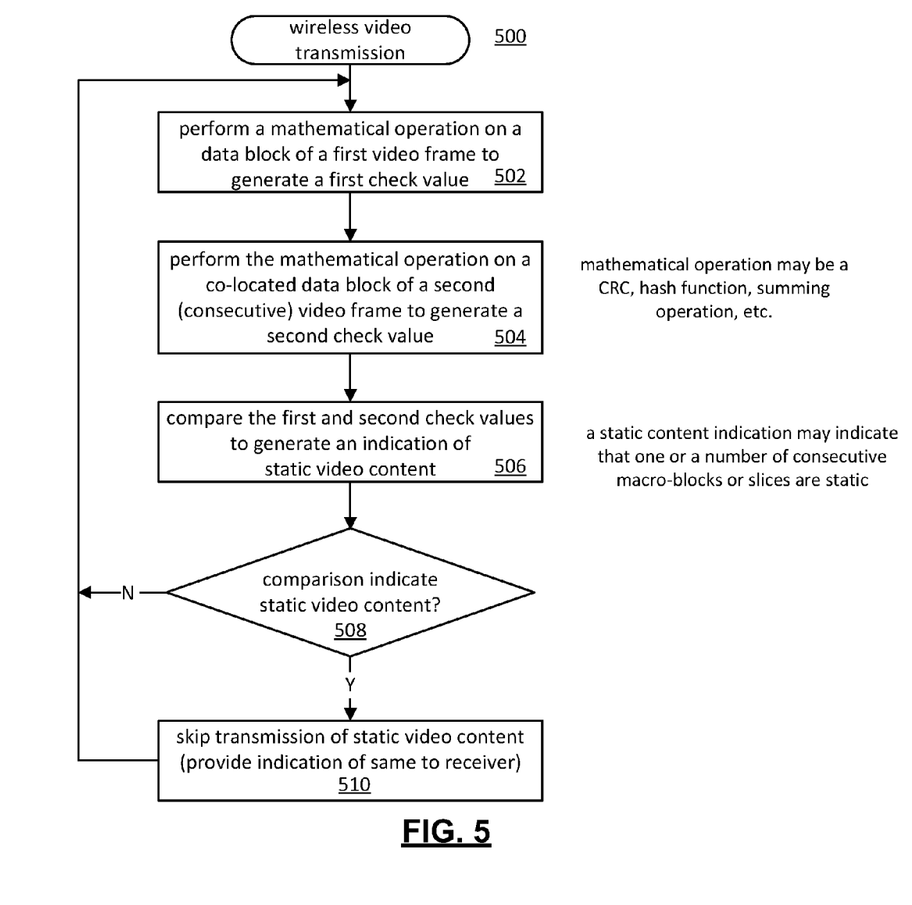
FIG. 5 is an operational flow diagram illustrating a method for detecting static content in accordance with an embodiment of the present disclosure.

FIG. 5 is an operational flow diagram 500 illustrating a method for detecting static content in accordance with an embodiment of the present disclosure. In step 502 of this embodiment, a mathematical operation is performed on a data block (e.g., a macro-block or slice) or a reconstructed data block of a first video frame to generate a first check value. The mathematical operation may comprise a hash function, CRC, summing operation, etc. such as those described above. Next, in step 504, the mathematical operation is performed on a data block of a second video frame to generate a second check value. As noted, the first and second video frames may be consecutive video frames that include the current video frame and the preceding video frame.

The first and second check values are then compared in step 506 to generate an indication of static video content in the first and second data blocks. For example, if the check values are identical (or, in certain embodiments, within similarity thresholds) as determined in step 508, the video encoder may indicate that the content is static and provide a static indication. Alternatively, a transmitting system may skip encoding operations for corresponding static content, or remove (encoded) portions of such content from the video stream prior to transmission. It is noted that in certain embodiments a static content indication may indicate that one or a number of consecutive macro-blocks or slices are static. As shown in step 510, the transmitting system may also provide an indication of skipped static content to a receiving device. If the check values are not identical (or sufficiently dissimilar) as determined in step 508, the method repeats the preceding steps for subsequent data blocks.

Figure 6:
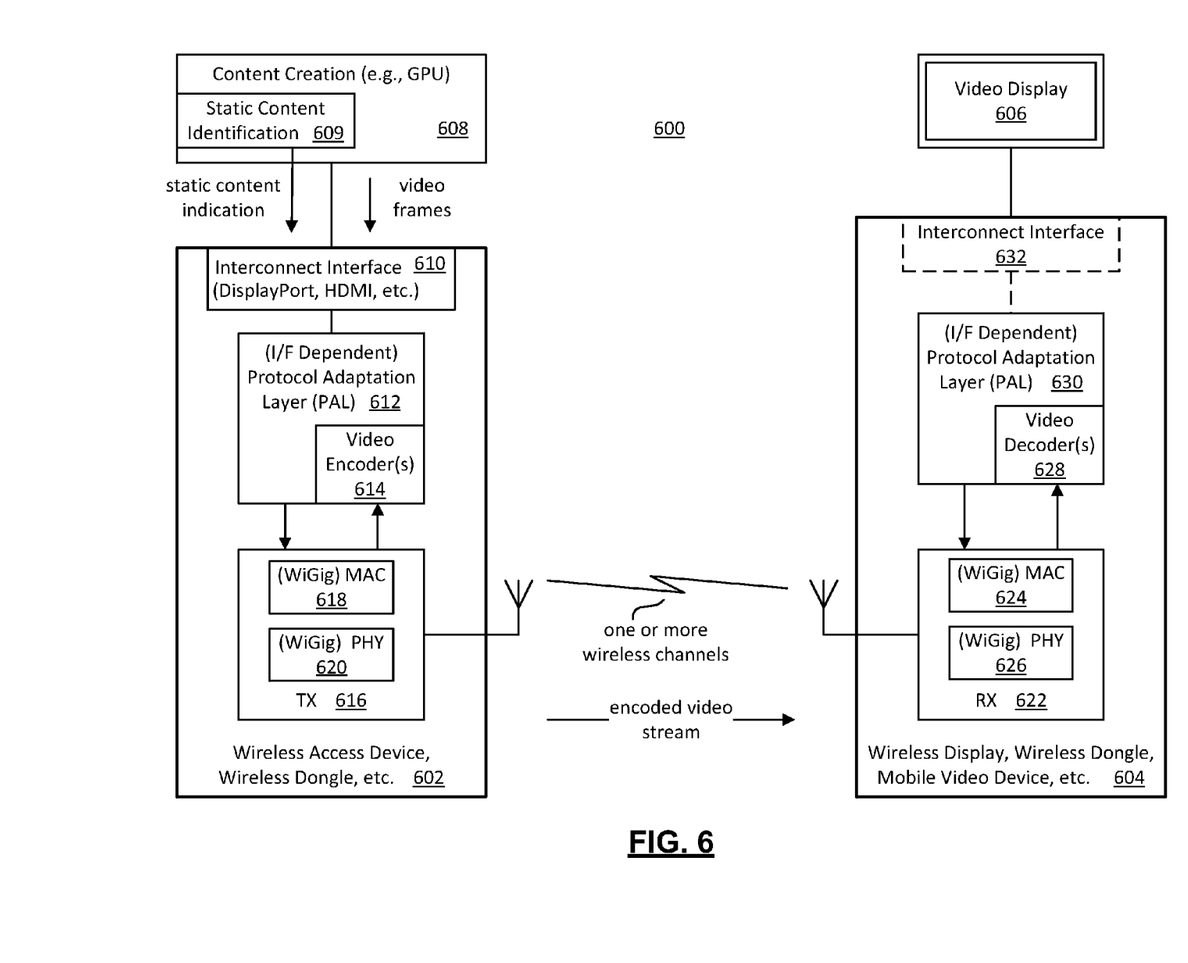
FIG. 6 is a block diagram representation of a communication network utilizing static content information generated upstream of source encoding in accordance with an alternate embodiment of the present disclosure.

FIG. 6 is a block diagram representation of a communication network 600 utilizing static content information generated upstream of source encoding in accordance with an alternate embodiment of the present disclosure. In this embodiment of the invention a content creation module 608 includes static content identification functionality 609 to identify (or help identify) and signal static video content. As will be appreciated, the content creation module 608 may take many forms, including a Graphics Processing Unit (GPU) that assembles and/or generates video for transmission to a wireless device. For example, a GPU in a gaming console or like device may produce a rendered video steam and static content indication data that is provided to the wireless access via a standardized interconnect/interface 610.

Alternatively, the video content and (in some embodiments) static content indication data may be communicated to the wireless access device 602 by various means such as those described above, including through a broadband internet/wide area network (WAN) connection. In one embodiment, the wireless access device 602 may be coupled to a cable or satellite set top box or the like by a standardized interconnect/interface such as an HDMI cable, an Ethernet cable, a high bandwidth wireless link (e.g., a WiGig or WirelessHD compliant link) capable of transmitting standard or high definition video content, or various combinations of such technologies.

In the illustrated embodiment, the content creation module 608 may relay static content indication data to, e.g., a PAL 612 of a wireless access device 602 via an interconnect/interface 610 in accordance with a (modified) standardized protocol (PCIE, DisplayPort, HDMI, etc.), or as side information through a separate interface. Detection of static content prior to source encoding by a video encoder 614 may reduce computational requirements for the video encoder 614, potentially resulting in considerable power savings and/or mitigate the need for relatively expensive and power-consuming memory components in the wireless access device 602 that may otherwise be required for static content detection operations. In one embodiment, the video encoder 614 within the wireless access device 602 may utilize static content indication data received from the content creation module 608 to create a static indication within the compressed video stream to efficiently indicate which portion(s) of each frame (or picture) is (are) static. It is noted that the encoder 614 may be incorporated within or generally specified by a particular PAL 612. In other embodiments, the encoder 614 (as well as any additional encoding/transcoding processes) may be external to the PAL 612.

Encoded video content from the encoder 614 is then provided to a network interface or transceiver/transmitter (TX) 616 for transmission to video device 604. In the disclosed embodiment, TX 616 includes medium access control (MAC) 618 and physical layer (PHY) 620 circuitry or functionality. Among other functions, the PHY 620 establishes and terminates connections to a wireless channel(s). In the disclosed embodiment, PHY 620 generates and transmits modulated RF signals containing the encoded video stream over one or more wireless channels. The MAC 618 and PHY 620 may operate in accordance with a wide variety of communication protocols, such as those used in an IEEE 802.11ad or WiGig compliant network.

In the illustrated video device 604, a transceiver/receiver (RX) 622 receives RF signals (over one or more wireless channels) containing the encoded video stream. The PHY 626, in cooperation with the MAC 624, then demodulates and down converts these RF signals to extract the encoded video stream. In turn, the video decoder(s) 628 (which may be incorporated within or distinct from a PAL 630 of the video device 604) operates on video data from the extracted video stream to generate a decoded video stream for display on a video display 606. In one alternate embodiment, the video device 604 may transmit static content indication data to the video display 606, rather than reconstructing the full frame(s) including static content. This alternative approach may obviate the need for a frame buffer in the video device 604. The static content indication data may be conveyed via the interconnect/interface 632.

Via the PAL 630, an optional interconnect/interface 632 (including, for example, the various embodiments disclosed above in conjunction with interconnect/interface 610) may be utilized to provide decoded video content to, for example, a high definition television, computer monitor or projection system. In such embodiments, as well as other embodiments, the video display 606 may be part of or a separate component from the video device 604. Further, the video device 604 may function as a wireless relay to other (mobile) video devices for purposes of sharing communication capabilities/bandwidth and device resources, broadcast consumption, load balancing and distributed processes, power saving operations, etc. Other exemplary characteristics and capabilities of functional blocks 602-632 are described above in conjunction with the corresponding functional blocks of FIG. 1.

Figure 7:
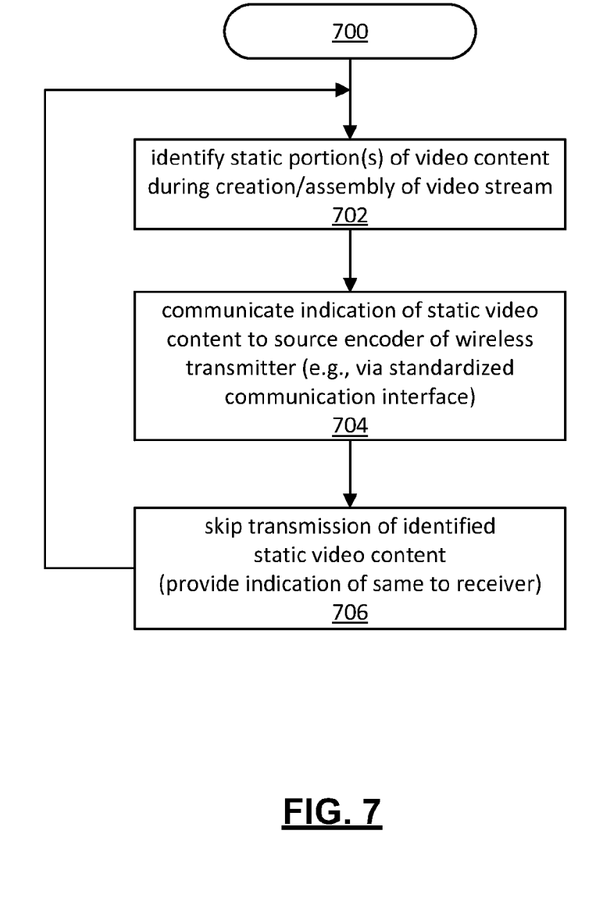
FIG. 7 is an operational flow diagram illustrating a method for utilizing static content information generated upstream of source encoding in accordance with an alternate embodiment of the present disclosure.

FIG. 7 is an operational flow diagram 700 illustrating a method for utilizing static content information generated upstream of source encoding in accordance with an alternate embodiment of the present disclosure. The method might be used, for example, by a communication network such as that illustrated in FIG. 6.

In step 702 of this embodiment, static portion(s) of video content are identified during the creation or assembly of a video stream that is provided to a transmitting device (e.g., a wireless dongle) for communication to other devices. Next, in step 704, indications of static video content are communicated to an encoding function of the transmitting device (e.g., via a standardized communication interface or a standardized communication interface modified to support static content indication data). The transmitting device may utilize such indications (step 706) to create a static indication within the compressed video stream to efficiently indicate which portion(s) of each frame (or picture) is (are) static, or to skip or remove static video content in a video stream such that it is not transmitted to a receiving device.

Figure 8:
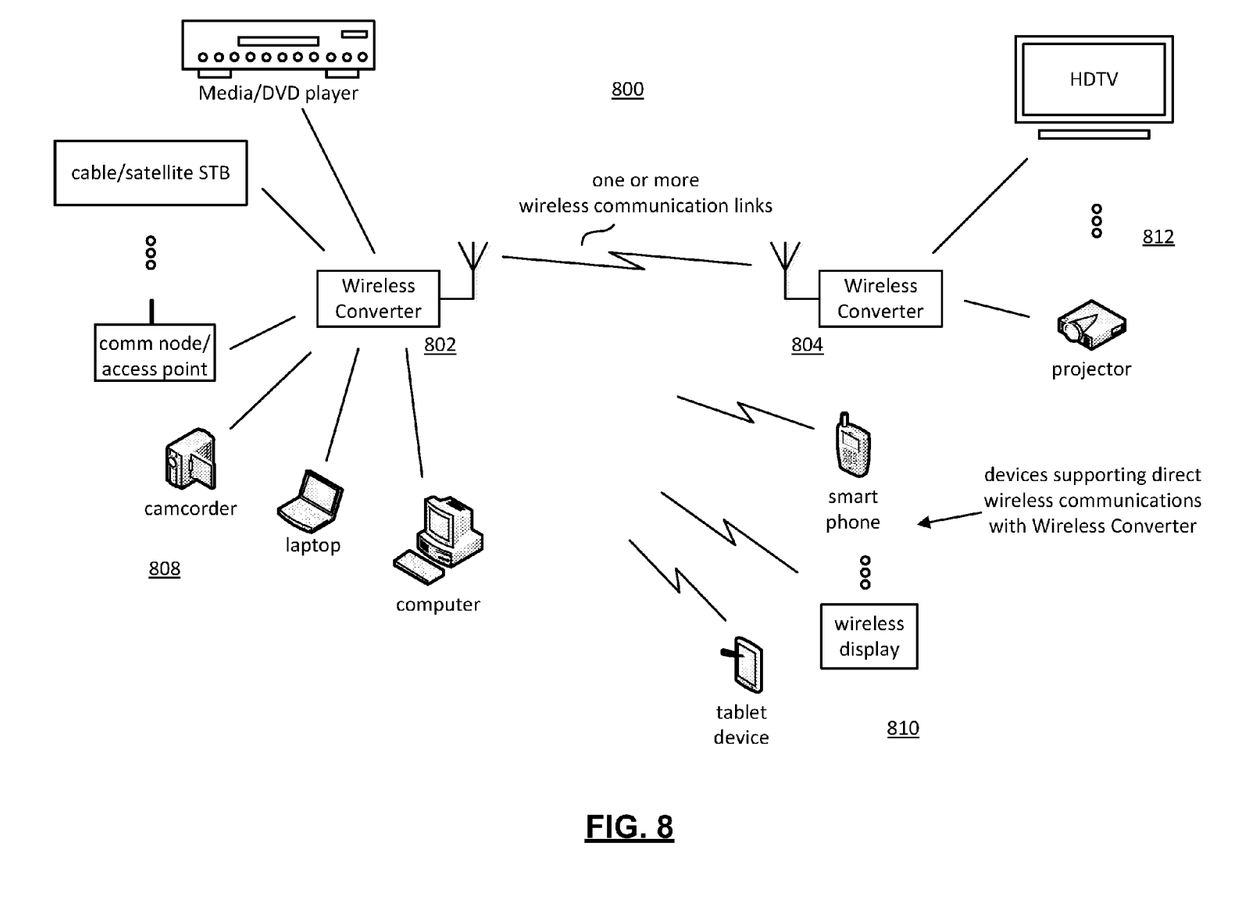
FIG. 8 is a block diagram representation of exemplary usage models employing static content detection in accordance with various embodiments of the present disclosure.

FIG. 8 is a block diagram representation of exemplary usage models employing static content detection in accordance with various embodiments of the present disclosure. More specifically, in these usage models a wireless converter 802 (e.g., a WiGig-compliant dongle) is used to transmit data, such as video content from a source device 808, over one or more wireless communication links for consumption by one or more display devices 812 (via a separate wireless converter 804). Source devices 808 might include, by way of example and without limitation, a media player, DVD or Blu-ray player, communication node or access point, camcorder, laptop, tablet device, desktop computer, cell phone, media server, and the like. Display device 812 might include, for example, a HDTV, display panel, projector, tablet, laptop, cell phone, kiosk, etc.

Alternatively, communications from the wireless converter 802 may be received by wireless devices 810 that either alone or in combination with other devices support direct wireless communications with the wireless converter 802 (e.g., through integrated multi-band radio communication circuitry). In addition to the foregoing (e.g., 808 and 812), such devices 810 might include, for example, a smart phone, tablet device, remote gaming interface, portable media player, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method performed on a video stream having a plurality of video frames, the method supporting wireless transmission of an encoded version of the video stream, the method comprising:
performing a mathematical operation on a first data block of a first video frame to generate a first check value;
performing the mathematical operation on a second data block of a second video frame to generate a second check value, the first check value and the second check value represented with a lesser number of bits than the first and second data blocks, respectively;
comparing the first check value and the second check value to identify static video content, including determining if the first check value and the second check value are equal or substantially equal;
in response to static video content, generating an indication of static video content for use in decoding a portion of the encoded version of the video stream corresponding to at least one of the first data block or the second data block; and
wirelessly transmitting the encoded version of the video stream, wherein the indication of static video content is a short code that is transmitted in lieu of a portion of the encoded version of the video stream corresponding to at least one of the first data block or the second data block.

2. The method of claim 1, wherein the first and second video frames are consecutive video frames of the video stream.

3. The method of claim 1, the first and second data blocks co-located in the first and second video frames, respectively.

4. The method of claim 1, the first and second data blocks comprising macro-blocks of a video frame.

5. The method of claim 1, the first and second data blocks comprising slices of a video frame.

6. The method of claim 1, the mathematical operation comprising a cyclic redundancy check that results in check values of fixed length.

7. The method of claim 1, the mathematical operation comprising a summing operation performed on corresponding portions of the first and second data blocks.

8. The method of claim 1, the mathematical operation comprising a hash function.

9. The method of claim 1, the first and second data blocks comprising reconstructed macro-blocks of the first and second video frames, respectively, the reconstructed macro-blocks generated during an encoding process.

10. Device circuitry that supports static content detection in a video stream having a plurality of video frames, the device circuitry comprising:
interface circuitry operable to access video frames of the video stream;
processing circuitry coupled with the interface circuitry to receive a first data block of a first video frame and a second data block of a second video frame, the processing circuitry configured to:
perform a mathematical operation on the first data block to generate a first check value;
perform the mathematical operation on the second data block to generate a second check value, the first check value and the second check value represented with a lesser number of bits than the first and second data blocks, respectively;
compare the first check value and the second check value to identify static video content by determining if the first check value and the second check value are equal or substantially equal;
in response to static video content, generate an indication of static video content for use in decoding a portion of an encoded version of the video stream corresponding to at least one of the first data block or the second data block; and
transmit via a wireless interface the encoded version of the video stream, wherein the indication of static video content is a short code that is transmitted in lieu of a portion of the encoded version of the video stream and that corresponds to at least one of the first data block or the second data block.

11. The device circuitry of claim 10, the first and second video frames being consecutive video frames of the video stream.

12. The device circuitry of claim 10, the first and second data blocks co-located in the first and second video frames, respectively.

13. An apparatus that supports static content detection in a video stream having a plurality of video frames including a first video frame and a second video frame, the apparatus comprising:
   static content detection circuitry configured to:
      perform a mathematical operation on a first data block of the first video frame to generate a first check value;
      perform the mathematical operation on a second data block of the second video frame to generate a second check value, the first check value and the second check value represented with a lesser number of bits than the first and second data blocks, respectively;
      compare the first check value and the second check value to identify static video content by determining if the first check value and the second check value are equal or substantially equal; and
      in response to static video content, generate an indication of static video content for use in decoding a portion of an encoded version of the video stream corresponding to at least one of the first data block or the second data block; and
   a wireless network interface coupled to the static content detection circuitry, the wireless network interface configured to support transmission of the encoded version of the video stream over one or more wireless channels, wherein the indication of static video content is a short code, and wherein transmission of the encoded version of the video stream includes transmitting the short code in lieu of the portion of the encoded version of the video stream corresponding to at least one of the first data block or the second data block.

14. The apparatus of claim 13, wherein the first and second data blocks are co-located in the first and second video frames, respectively, and the first and second video frames are consecutive video frames of the video stream.

15. The apparatus of claim 13 configured as a wireless dongle device.

16. The apparatus of claim 13, wherein the first and second data blocks are co-located slices of the first and second video frames, respectively, and the first and second video frames are consecutive video frames of the video stream.

17. The apparatus of claim 13, the mathematical operation comprising a cyclic redundancy check that results in check values of fixed length.

18. The apparatus of claim 13, the mathematical operation comprising a summing operation performed on corresponding portions of the first and second data blocks.

19. The apparatus of claim 13, where the wireless network interface supports one or more of cellular communications, wireless local area network communications, or wireless personal area network communications.

20. The method of claim 1, wherein wirelessly transmitting corresponds to one or more of cellular communications, wireless local area network communications, or wireless personal area network communications.

* * * * *